United States Patent
Ellis et al.

(10) Patent No.: US 10,796,264 B2
(45) Date of Patent: Oct. 6, 2020

(54) RISK ASSESSMENT IN ONLINE COLLABORATIVE ENVIRONMENTS

(71) Applicant: International Business Machines Corporation, Armonk, NY (US)

(72) Inventors: Paul J. Ellis, Dublin (IE); John Kennedy, Dublin (IE); Sarah McGlynn, Dublin (IE); Paulito P. Palmes, Dublin (IE); Krzysztof J. Szlejter, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 14/847,533

(22) Filed: Sep. 8, 2015

(65) Prior Publication Data

US 2017/0068918 A1    Mar. 9, 2017

(51) Int. Cl.
| | |
|---|---|
| G06Q 10/06 | (2012.01) |
| G06Q 10/10 | (2012.01) |
| G06Q 30/00 | (2012.01) |
| G06F 16/33 | (2019.01) |
| G06F 21/57 | (2013.01) |
| H04L 29/06 | (2006.01) |

(52) U.S. Cl.
CPC ....... *G06Q 10/06395* (2013.01); *G06F 16/33* (2019.01); *G06F 21/577* (2013.01); *G06Q 10/101* (2013.01); *G06Q 30/016* (2013.01); *H04L 63/1433* (2013.01); *G06F 2221/2149* (2013.01)

(58) Field of Classification Search
CPC ........ G06Q 10/00; G06Q 10/06; G06Q 10/10; G06F 17/22

USPC ........................................................ 705/7.41
See application file for complete search history.

(56) References Cited

U.S. PATENT DOCUMENTS

| | | | |
|---|---|---|---|
| 8,332,765 B2 | 12/2012 | Ergan et al. | |
| 8,645,263 B1 | 2/2014 | Seel et al. | |
| 9,183,072 B1 | 11/2015 | Makuch et al. | |
| 9,189,317 B1 | 11/2015 | Marimuthu | |
| 9,250,993 B2* | 2/2016 | Mani | G06F 16/285 |
| 2002/0123983 A1* | 9/2002 | Riley | G06Q 10/00 |

(Continued)

OTHER PUBLICATIONS

IBM, List of IBM Patents or Patent Applications Treated as Related, Appendix P, dated Mar. 17, 2016, 2 pages.

(Continued)

*Primary Examiner* — Nga B Nguyen
(74) *Attorney, Agent, or Firm* — Richard A. Wilhelm (57) ABSTRACT

Text content provided to one or more content providers that contains one or more textual elements describing an issue experienced by a user interacting with a product in development is received. The received text content into one or more textual elements of interest associated with the issue is parsed. Whether there exists issue entries in a repository that include one or more of the textual elements of interest, wherein each entry includes a predetermined risk level associated with the issue is determined. If there exists a plurality of entries in a repository that include one or more of the textual elements of interest: entry in the repository that most closely matches the one or more textual elements of interest is identified, and a risk level for the issue, based, in part, on the predetermined risk level of the identified entry, is determined.

15 Claims, 7 Drawing Sheets

(56) References Cited

U.S. PATENT DOCUMENTS

| | | | |
|---|---|---|---|
| 2002/0188688 A1 | 12/2002 | Bice et al. | |
| 2003/0014405 A1* | 1/2003 | Shapiro | G06F 16/951 |
| 2004/0015556 A1 | 1/2004 | Chopra | |
| 2006/0230033 A1* | 10/2006 | Halevy | G06F 17/243 |
| 2007/0168874 A1* | 7/2007 | Kloeffer | G06F 8/65 |
| | | | 715/764 |
| 2007/0174731 A1* | 7/2007 | Haeberle | G06F 11/0748 |
| | | | 714/46 |
| 2008/0005137 A1* | 1/2008 | Surendran | G06N 20/00 |
| 2008/0133516 A1* | 6/2008 | Itzhak | G06F 16/9535 |
| 2008/0162688 A1* | 7/2008 | Reumann | G06F 11/0748 |
| | | | 709/224 |
| 2009/0276728 A1* | 11/2009 | Doan | G06Q 10/10 |
| | | | 715/810 |
| 2009/0313219 A1* | 12/2009 | Gupta | G06Q 10/10 |
| 2009/0327237 A1* | 12/2009 | Zhang | G06F 16/951 |
| 2010/0070503 A1 | 3/2010 | Abraham | |
| 2010/0115348 A1* | 5/2010 | Gilluwe | G06F 9/453 |
| | | | 714/57 |
| 2010/0268661 A1 | 10/2010 | Levy et al. | |
| 2010/0274616 A1* | 10/2010 | Grace | G06Q 10/063 |
| | | | 705/7.11 |
| 2011/0060946 A1* | 3/2011 | Gupta | G06F 11/0709 |
| | | | 714/26 |
| 2011/0078167 A1* | 3/2011 | Sundaresan | G06F 17/2785 |
| | | | 707/765 |
| 2011/0219001 A1* | 9/2011 | Marik | G06F 16/00 |
| | | | 707/738 |
| 2012/0079098 A1* | 3/2012 | Moehler | G06F 11/0775 |
| | | | 709/224 |
| 2012/0198355 A1* | 8/2012 | Lau | G06Q 10/10 |
| | | | 715/752 |
| 2013/0132144 A1* | 5/2013 | Kruempelmann | G06Q 10/06 |
| | | | 705/7.17 |
| 2013/0151508 A1* | 6/2013 | Kurabayashi | G06F 17/2223 |
| | | | 707/723 |
| 2013/0275392 A1 | 10/2013 | Bhatt et al. | |
| 2014/0129536 A1* | 5/2014 | Anand | G06Q 10/0635 |
| | | | 707/706 |
| 2014/0173350 A1 | 6/2014 | Roy et al. | |
| 2014/0279878 A1* | 9/2014 | Buerk | G06Q 10/06316 |
| | | | 707/611 |
| 2015/0006519 A1 | 1/2015 | Jain et al. | |
| 2015/0138994 A1 | 5/2015 | Dadheech et al. | |
| 2015/0193720 A1* | 7/2015 | Uthra | G06Q 10/063112 |
| | | | 705/7.14 |
| 2016/0034905 A1* | 2/2016 | Hopper | G06Q 30/016 |
| | | | 705/304 |
| 2016/0070722 A1* | 3/2016 | Heyward | G06F 16/58 |
| | | | 707/772 |
| 2016/0224910 A1* | 8/2016 | Deng | G06Q 10/0633 |

OTHER PUBLICATIONS

Pending U.S. Appl. No. 15/072,586, filed Mar. 17, 2016 entitled: "Risk Assessment in Online Collaborative Environments", 35 pages.
Neelima et al., "Bug Detection through Text Data Mining", International Journal of Advanced Research in Computer Science and Software Engineering, vol. 3, Issue 5, May 2013, ISSN: 2277 128X, © 2013 IJARCSSE, pp. 564-569, Available online at: <www.ijaresse.com>.
Mell et al., "The NIST Definition of Cloud Computing," National Institute of Standards and Technology, U.S. Department of Commerce, Special Publication 800-145, Sep. 2011, pp. 1-7.
U.S. Appl. No. 15/072,586, filed Mar. 17, 2016.

* cited by examiner

RISK ASSESSMENT IN ONLINE COLLABORATIVE ENVIRONMENTS

BACKGROUND OF THE INVENTION

The present invention relates to generating work items in collaborative environments, and more particularly to ascertaining a risk level for work items for administrative users of the collaborative environments.

A company may develop a product, such as a software product. The company may operate an online forum for users of the software product to report, describe, and discuss issues that have occurred. The goal of reporting and describing issues on the online forum is to create a collaborative environment for users, such that users of the online forum can resolve the reported issues or provide other references to help resolve reported issues. In some instances, a user may inadequately describe an issue (e.g., bug or software defect), which may delay a process for resolving the reported issue.

SUMMARY

Embodiments of the present invention disclose a method, computer program product, and system for assessing a risk level for a reported issue. Text content provided to one or more content providers that contains one or more textual elements describing an issue experienced by a user interacting with a product in development is received. The received text content into one or more textual elements of interest associated with the issue is parsed. Whether there exists issue entries in a repository that include one or more of the textual elements of interest, wherein each entry includes a predetermined risk level associated with the issue that indicates a likelihood that the issue will hinder the user interaction with the product is determined. Responsive to determining that there exists a plurality of entries in a repository that include one or more of the textual elements of interest: entry in the repository that most closely matches the one or more textual elements of interest is identified, and a risk level for the issue, based, in part, on the predetermined risk level of the identified entry, is determined. A work item to an administrative user, wherein the work item indicates to the administrative user to resolve the issue is assigned.

In another embodiment of the present invention, responsive to determining that there exists a single entry in the repository that includes one or more of the textual elements of interest: the predetermined risk level of the single entry to the risk level for the issue is assigned.

In yet another embodiment of the present invention, responsive to determining that no entries in the repository that includes one or more of the textual elements of interest: a risk level based, in part, on the one or more textual elements of interest is determined.

DETAILED DESCRIPTION

Embodiments of the present invention provide systems and methods for ascertaining a risk level for an error message reported in a collaborative environment. The risk level may be used to qualify a severity for the issues reported to the collaborative environment, and indicate the likelihood of the reported issue being a critical issue which can greatly hinder on a user's experience with a product that is in development. Embodiments of the present invention utilize databases containing information of previously determined risk levels for known error messages, as well as analyze text content reported to the collaborative environment to ascertain a risk level for the reported error message. Various text element weighting, comparison, and mining techniques are used to ascertain the risk level of the reported error message.

Figure 1:
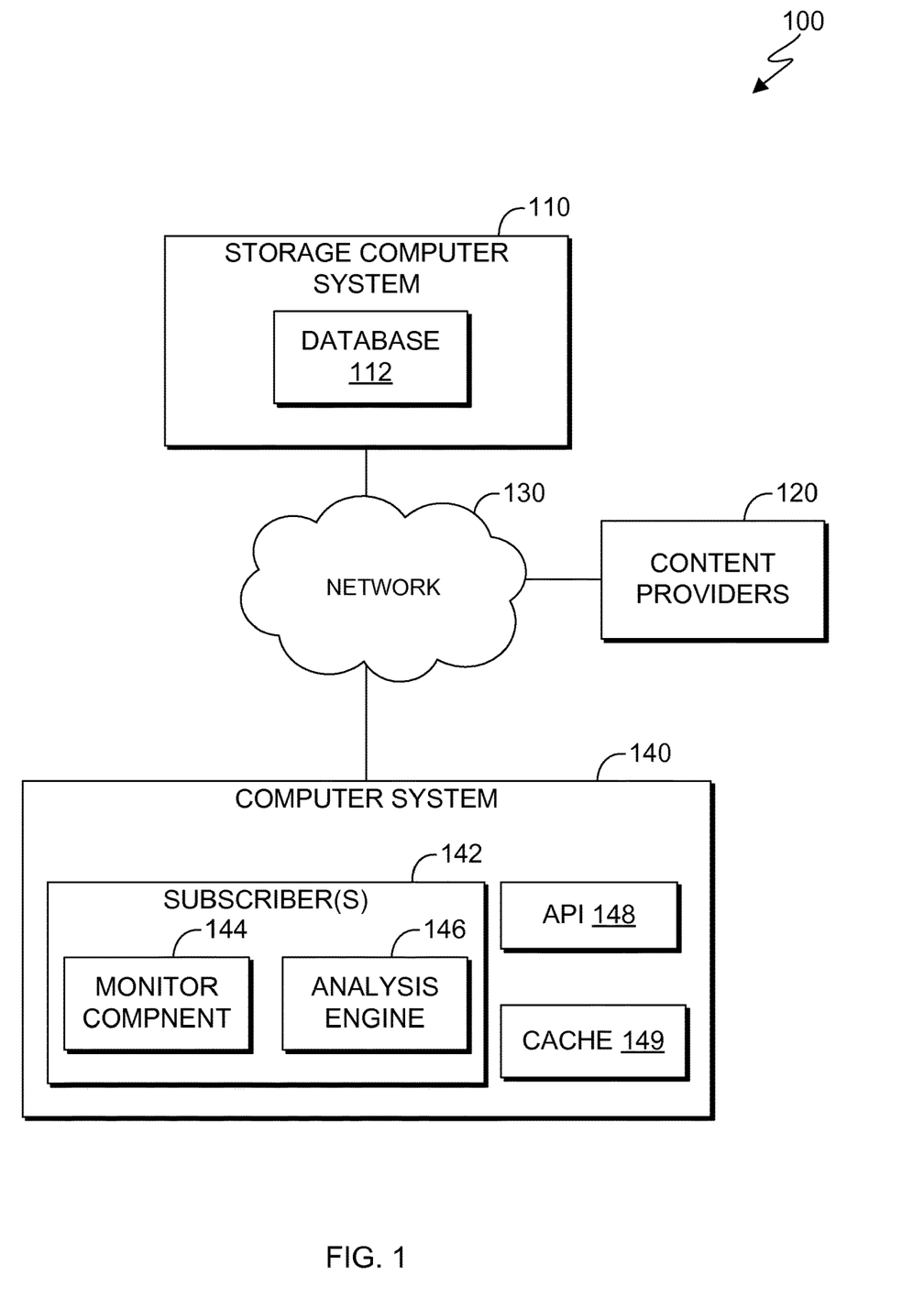
FIG. 1 is a functional block diagram of a risk level assessment system, in accordance with an embodiment of the present invention.

FIG. 1 is a functional block diagram of risk level assessment system 100, in accordance with an embodiment of the present invention. Risk level assessment system 100 includes storage computer system 110, computer system 140, and one or more content providers 120. Storage computer system 110 and computer system 140 can be desktop computers, laptop computers, specialized computer servers, or any other computer systems known in the art, in accordance with an embodiment of the invention. In certain embodiments, storage computer system 110 and computer system 140 represent computer systems utilizing clustered computers and components to act as a single pool of seamless resources when accessed through network 130. For example, such embodiments may be used in data center, cloud computing, storage area network (SAN), and network attached storage (NAS) applications. In general, storage computer system 110 and computer system 140 are representative of any electronic devices, or combination of electronic devices, capable of executing machine-readable program instructions, as described in greater detail with regard to FIG. 5. In other embodiments, computer system 140 and storage computer system 110 may be implemented in a cloud computing environment, as described in relation to FIGS. 6 and 7 below. Furthermore, risk level assessment system 100 can be implemented in a cloud computing environment as further described with regard to FIGS. 6 and 7.

Storage computer system 110 represents a platform that maintains a database of reported issues and their associated error messages and/or error codes. Storage computer system 110 includes database 112. In one embodiment, one or more databases may be a part of database 112. For example, database 112 may contain issues that have been reported and previously resolved, identified by error messages and/or error codes. In another example, database 112 is configured as a JavaScript Object Notation (JSON) database. In this instance, the JSON database may contain a cache of verified responses previously reported to content providers 120 for defects descriptions, error messages, and/or error codes. In another example, database 112 can contain defect descriptions for known defects. In yet another example, database 112 can include a rational test or quality management database, where evaluated risk levels for known defects are stored. In general, storage computer system 110 stores information regarding risk levels for existing error messages, defects, defect descriptions, and responses that resolve issues relating to error messages. Database 112 can be accessed by computer system 140 and components therein to analyze, ascertain, and evaluate risk levels for reported error messages, as described in greater detail below.

Computer system 140 represents a platform by which one or more automated subscribers may retrieve, via one or more content providers, and analyze the information relating to issues and their associated error messages and/or error codes stored in storage computer system 110. Computer system 140 includes one or more subscribers 142, application program interface (API) 148, and cache 149. In one embodiment, each of the one or more subscribers 142 is configured to monitor and analyze text content of content providers 120 for the purpose of determining risk levels of reported issues, according to their error messages and/or error codes. For example, risk level assessment system 100 may include three content providers 120, described in more detail below, and computer system 140 may include three subscribers 142. Furthermore, each of the three subscribers 142 are configured to monitor and analyze text content of one of the three content providers 120. In another embodiment, one subscriber 142 is configured to monitor and analyze text content of content providers 120. For example, one subscriber 142 may be configured to monitor and analyze text content of the three content providers 120. In certain embodiments, computer system 140 is used to identify administrative users, generate a work item to address a newly reported error message or a newly reported issue, and assign the work item to one or more of the identified administrative users. In yet another embodiment, computer system 140 may use analysis engine 146 and a repository of previously identified error messages (e.g., cache 149, database 112, etc.) to determine whether an error message is detected.

API 148 can interact with database 112 to identify objects similar to one or more textual elements of interest, stored in database 112 similar to one or more textual elements of interest, for example, error messages, and error codes, as described in greater detail below. In another embodiment, API 148 may interact with cache 149 to identify one or more objects stored in cache 149 similar to one or more textual elements of interest. In general, API 148 is implemented by computer system 140 to identify objects in database 112 (e.g., a JSON database) and/or cache 149, which are used to ascertain and evaluate risk levels of error messages reported to content providers 120.

Subscribers 142 represent programs that automatically monitor the content of database 112 to identify, download, and analyze new issue reported entries. Each of one or more subscribers 142 includes monitor component 144 and analysis engine 146. In an embodiment, subscribers 142 registers (i.e., subscribes) to content providers 120, such that text content reported by users to content providers 120 that is stored in database 112 is monitored and analyzed by monitor component 144 and analysis engine 146, respectively. For example, a first user may report text content to content providers 120 at a first time (i.e., newly reported text content). Subsequently, subscribers 142 may be notified of the newly reported text content by monitor component 144. Furthermore, subscribers 142 can initiate analysis of the newly reported text content by signaling analysis engine 146 to parse the text content into one or more textual elements of interest, as described in greater detail later in this specification. For example, analysis engine 146 may employ a term-frequency-inverse-document-frequency (TFIDF) weighting mechanism to weigh parsed textual elements of the text content.

Content providers 120 can be one or more online forums or online communities configured to support collaborative interactions between a plurality users developing a product. In an embodiment, the plurality of users can collaborate with one another by interacting with content providers 120 to resolve and address issues regarding the project in development (i.e., debug, report error messages, provide defect descriptions, etc.). For example, a first user may experience an issue with a software program in development (e.g., a software bug, program defect, etc.). Furthermore, the first user can report the issue to content providers 120 by providing text content to content providers 120 that describes the issue that the first user experienced. In embodiments of the invention, each instance of text content reported to content providers 120 may include at least an error message, and may include a defect, a defect description, and/or error codes for the error message. It should be understood that, text content reported to content providers 120 can be stored in one or more repositories (e.g., database 112, etc.). Furthermore, the product in development may include one or more modules, wherein each of the one or more modules has at least one administrative user assigned to maintain, update, and develop the module. Accordingly, the at least one administrative user may receive a work item that specifies a risk level associated with an error message or issue reported to content providers 120 that involves the module of the product, indicating to the at least one administrative user to address, resolve, and/or update the module of the product.

The phrase, "instance of text content," as used herein, refers to one occurrence of a user reporting text content to content providers 120. For example, a user may report text content to content providers 120 (i.e., a first instance of newly reported text content). Subscribers 142 can be notified by monitor component 144 of the first instance of newly reported text content and initiate an analysis process of the text content via analysis engine 146. For example, the first instance of newly reported text content may include the following user reported issue: "'Object Variable Not Set,' appears when I try to close a calendar entry." Analysis engine 146 "'Object Variable Not Set'" can be identified as an error message using API 148, one or more repositories (e.g., cache 149, database 112, etc.), and analysis engine 146. The phrase, "error message," as used herein, refers to information displayed to a user when an unexpected condition occurs when using a product in development. Furthermore, analysis engine 146 may parse the first instance of newly reported text content into one or more textual elements of interest, such as, "close," "calendar," and "entry." A second instance of reported text content may include an additional numerical string, such as: "'Object Variable Not Set (91),' appears when I try to close a calendar entry." In this example, the "91" numerical string is an additional parameter for the error message "Object Variable Not Set." Furthermore, analysis engine 146 may determine that the error message from the first instance of text content and the second instance of text content reported to content providers 120 are similar, and that the "91" numerical string is identified as an error code. It should be understood that, each instance of text content reported to content providers 120 can be reported to one or more online communities or forums of content providers 120, on one or more web-pages of each of the one or more online communities or forums of content providers 120, or any combinations thereof in an online collaborative environment of content providers 120.

Network 130 can be, for example, a local area network (LAN), a wide area network (WAN) such as the Internet, or a combination of the two, and include wired, wireless, or fiber optic connections. In general, network 130 can be any combination of connections and protocols that will support communications between storage computer system 110 and each computer system 140, in accordance with a desired embodiment of the invention.

Figure 2:
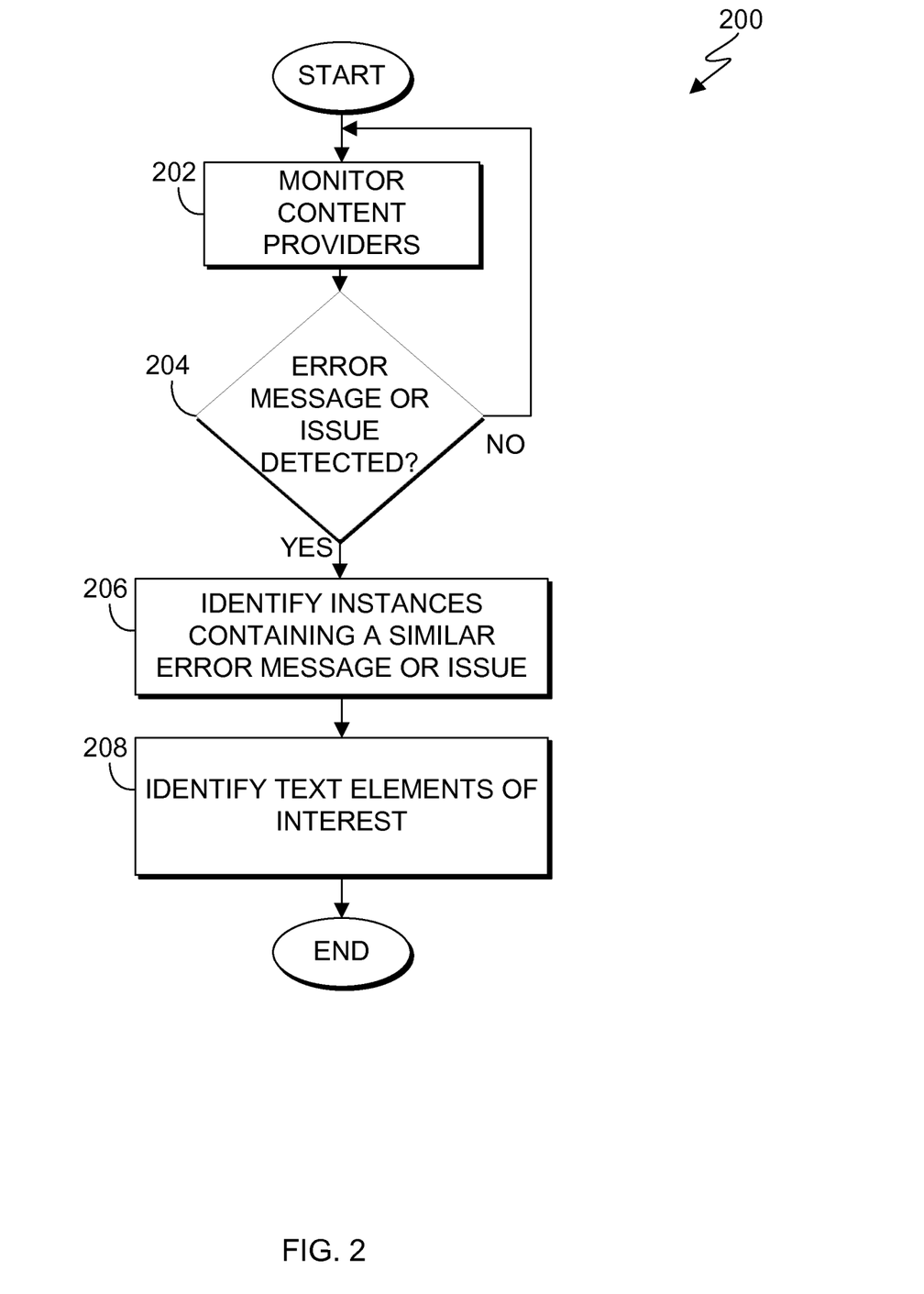
FIG. 2 is a flowchart illustrating operational steps for analyzing for analyzing text content reported to content providers, in accordance with an embodiment of the present invention.

FIG. 2 is a flowchart 200 illustrating operational steps for analyzing text content reported to content providers 120, in accordance with an embodiment of the present invention. In this embodiment, computer system 140 and components therein monitor and analyze text content reported to content providers 120 to identify newly reported error messages. As previously described, text content reported to content providers 120 that is analyzed by analysis engine 146 includes at least an error message. Furthermore, analysis engine 146 analyzes the newly reported text content to identify a newly reported error message and identify one or more textual elements of interest associated with the newly reported error message. In this embodiment, analysis engine 146 also identifies each instance of text content in content providers 120 containing a similar error message as the newly reported error message. Accordingly, analysis engine 146 analyzes text content of content providers 120 to identify the one or more textual elements of interest associated with the newly reported error message, the newly reported error message, and additional instances of text content containing a similar error message as the newly reported error message.

In step 202, subscribers 142 monitor content providers 120 for text content reported to content providers 120. In this embodiment, computer system 140 implements monitor component 144 to monitor content providers 120 for newly reported text content. As described above, a plurality of users may interact with content providers 120 to report issues related to a project in development. In this instance, each of the plurality of users may report an issue at different times. Accordingly, monitor component 144 is configured to continuously monitor content providers 120 via network 130 for newly reported text content. In another embodiment, subscribers 142 may monitor text content reported to content providers 120 that is stored in database 112, as previously described.

In decision 204, subscribers 142 determines whether an error message or an issue is detected in the newly reported text content. In one embodiment, subscribers 142 use analysis engine 146 and a repository of previously identified error messages (e.g., cache 149, database 112, etc.) to determine whether an error message is detected. In certain embodiments, a user may report an issue by providing text content to content providers 120 that may not contain an error message, but still describes an issue related to a software in development. For example, the user may report an unexpected shut-down of the software in development, in which case no error message was prompted to the user. In this instance, the user may provide a defect and/or defect description of the issue related to the software in development by reporting text content to content providers 120. Furthermore, analysis engine 146 may parse the text content for one or more textual elements of interest associated with the issue. Accordingly, analysis engine 146 may flag the newly reported text content to identify whether the newly reported text content contains an error message or an issue and subscribers 142 may signal analysis engine 146 to proceed with subsequent processing.

If in decision 204 subscribers 142 determines that an error message or an issue is not detected in the newly reported text content, then monitor component 144 continues to monitor content providers 120 for text content, as previously described in step 202.

If in decision 204 subscribers 142 determine that an error message or an issue is detected in the newly reported text content, then in step 206, subscribers 142 identify each instance of content providers 120 that contains an error message or an issue similar to the newly reported error message or issue. For example, three online forums may be a part of content providers 120 for a collaborative online environment for software development. In this instance, subscribers 142 may identify an error message in text content of a first of the three online forums. Furthermore, subscribers 142 may indicate to components therein to monitor and analyze text content of a second and a third of the three online forums to determine whether an error message similar to the error message identified in the first of the three online forums can be identified. In one embodiment, an error message or an issue may be similar to the newly reported error message or issue if both of which contain an identical string of text, defect and defect descriptions, and/or error codes.

In step 208, subscribers 142 identifies one or more textual elements of interest from the one or more identified instances of content providers 120 containing an error message or an issue similar to that contained in the newly reported text content. In this embodiment, analysis engine 146 analyzes text content of the one or more instances of content providers 120 identified in step 206. In one embodiment, analysis engine 146 may use a text mining process to parse the text content into textual elements. Furthermore, analysis engine 146 may weigh the textual elements based on one or more conditions (e.g., pre-determined importance of text elements, frequency of text elements, number of views for an identified instance, number of replies and/or responses to an identified instance, etc.) to identify one or more textual elements of interest. For example, analysis engine 146 may employ a term-frequency-inverse-document-frequency (TFIDF) weighting mechanism to weigh parsed textual elements of the text content. In this example, the TFIDF mechanism may identify one or more textual elements not of interest, such as, "the", "a", "an", etc., and discard the one or more textual elements not of interest. Accordingly, textual elements of interest are identified from text content of one or more instances of content providers 120 containing a similar error message.

Figure 3:
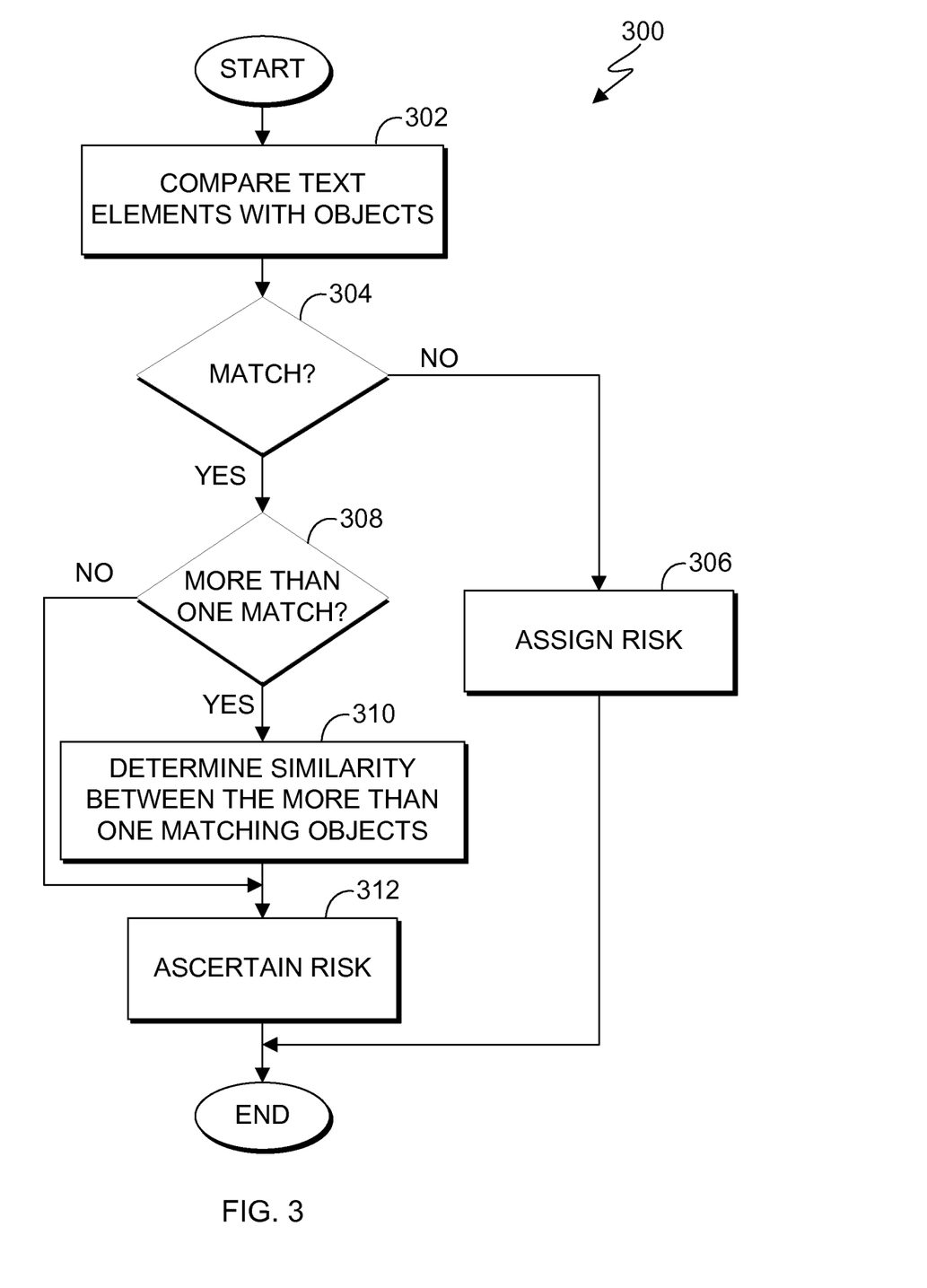
FIG. 3 is a flowchart illustrating operational steps for ascertaining a risk level for an error message or an issue, in accordance with an embodiment of the present invention.

FIG. 3 is a flowchart 300 illustrating operational steps for ascertaining a risk level for an error message or an issue, in accordance with an embodiment of the present invention. In this embodiment, computer system 140 ascertains a risk level for a newly reported error message or a newly reported issue identified from newly reported text content of content providers 120. For an issue being reported for the first time, an existing risk level may not be specified for a particular error message, in which case computer system 140 assigns a risk level to the particular error message based on one or more conditions, as further described herein. There may be instances of text content of content providers 120 that contain a similar error message or issue as that contained in the newly reported text content that may have a risk level that has been ascertained or assigned by computer system 140. Furthermore, the risk levels for previously reported text content (i.e., additional instances of text content of content providers 120) can be stored in database 112. Accordingly, computer system 140 can ascertain a risk level for the newly reported error message or newly reported issue by referencing database 112 to identify existing risk levels. In general, computer system 140 uses the newly reported error message or the newly reported issue and the one or more textual elements of interest, as previously described with regard to FIG. 2, and accesses with storage computer system 110 to ascertain a risk level for the newly reported error message or the newly reported issue.

In step 302, subscribers 142 compare one or more textual elements of interest to objects stored in a repository (e.g., database 112, cache 149, etc.). In this embodiment, objects stored in the repository may include previously reported error messages (and issues), defects, and defect descriptions. In one embodiment, API 148 may access database 112 to identify objects similar to the one or more textual elements of interest, based, at least in part, on a similarity threshold. In another embodiment, API 148 may access cache 149 to compare one or more textual elements of interest with objects stored in cache 149. Furthermore, the objects stored in cache 149 can be error messages, defects, and defect descriptions that have been most recently processed and/or referenced by computer system 140 in a previous risk ascertainment operation. In this instance, cache 149 may transmit expiring objects in cache 149 to database 112 for long term storage.

In decision 304, subscribers 142 determines whether a match exists between the one or more textual elements of interest and an object in the repository (e.g., cache 149, database 112, etc.). In this embodiment, API 148 is implemented by computer system 140 to determine whether a match exists between the one or more textual elements of interest and the objects in the one or more databases 112. In one embodiment, the one or more textual elements of interest may match an object stored in cache 149. In this instance, the object may include a predetermined risk level for a newly reported error message or newly reported issue that is associated with the one or more textual elements of interest. Accordingly, API 148 may ascertain a risk level for the detected error message to be the predetermined risk level for the matching object stored in cache 149.

If in decision 304 subscribers 142 determines that a match does not exist between the one or more textual elements of interest and an object stored in the repository, then in step 306, computer system 140 assigns a risk level for the newly reported error message or the newly reported issue. In one embodiment, the assigned risk level may be based on various content provider metrics, for example, a number of responses or views that the newly reported text content received on content providers 120. In another embodiment, only a portion of the one or more textual elements provided by analysis engine 146 are matched with an object in the repository. For example, a newly reported text error message may be associated with one or more textual elements of interest, such as: "crash," "saving," and "data loss." In this instance, database 112 may include a list of textual elements along with a predetermined risk level for each textual element. Error messages or issues associated with "crash" in the list of textual elements may have a predetermined risk level of very high. Whereas, error messages or issues associated with "data loss" in the list of textual elements may have a predetermined risk level of high. Accordingly, computer system 140 may reference the list of textual elements along with the predetermined risk levels to assign a risk level to a non-matching newly reported error message or non-matching newly reported issue.

If in decision 304 subscribers 142 determines that at a match does exist between the one or more textual elements of interest and an object in the repository, then in decision 308, computer system 140 determines whether more than one object in the repository matches the one or more textual elements of interest. In this embodiment, API 148, is implemented by computer system 140 to determine whether more than one matching object exists. For example, a newly reported error message can be associated with one or more textual elements of interest, such as: "crash," "saving," and "data loss." In this instance, API 148 may identify more than one object in database 112 that matches the one or more textual elements of interest (i.e., "crash," "saving," and "data loss."). Accordingly, a different risk level may be associated for each of the matching objects, which may require further processing to identify a risk level to assign to the newly reported error message or the newly reported issue, as described further in subsequent operating steps.

If in decision 308 subscribers 142 determines that more than one match exists between objects in the repository and the one or more textual elements of interest associated with the newly reported error message or the newly reported issue, then in step 310, computer system 140 determines a similarity coefficient between the more than one matching objects. In one embodiment, a similarity coefficient can be determined by performing a weighting evaluation, such as a cosine similarity evaluation. In this instance, the cosine similarity evaluation compares how closely related (i.e., similar) the one or more textual elements of interest are to the more than one matching object and eventually identify a closest (i.e., a most similar) matching object. Accordingly, once the closest matching object stored in the repository (e.g., cache 149, database 112, etc.) is identified, computer system 140 may be configured to identify the risk level associated with the closest matching object and ascertain (i.e., assign) the risk level to the newly reported error message or the newly reported issue associated with the one or more text elements of interest.

In step 312, subscribers 142 ascertain a risk level for the newly reported error message or the newly reported issue. Computer system 140 may ascertain a risk level based on the matching object identified in decision 308 ("no" branch), or the closest object identified in step 310. Furthermore, the risk level may be further evaluated based on other factors, such as TFIDF weight, view frequency of the text content, database 112 internal weighting of a matching error message based on past record, availability/familiarity of engineer to address the work item, etc. Accordingly, by performing operational steps described in FIG. 3, computer system 140 ascertains or assigns a risk level for error messages and issues contained in text content reported to content providers 120, and may further evaluate the risk level based on additional factors.

Figure 4:
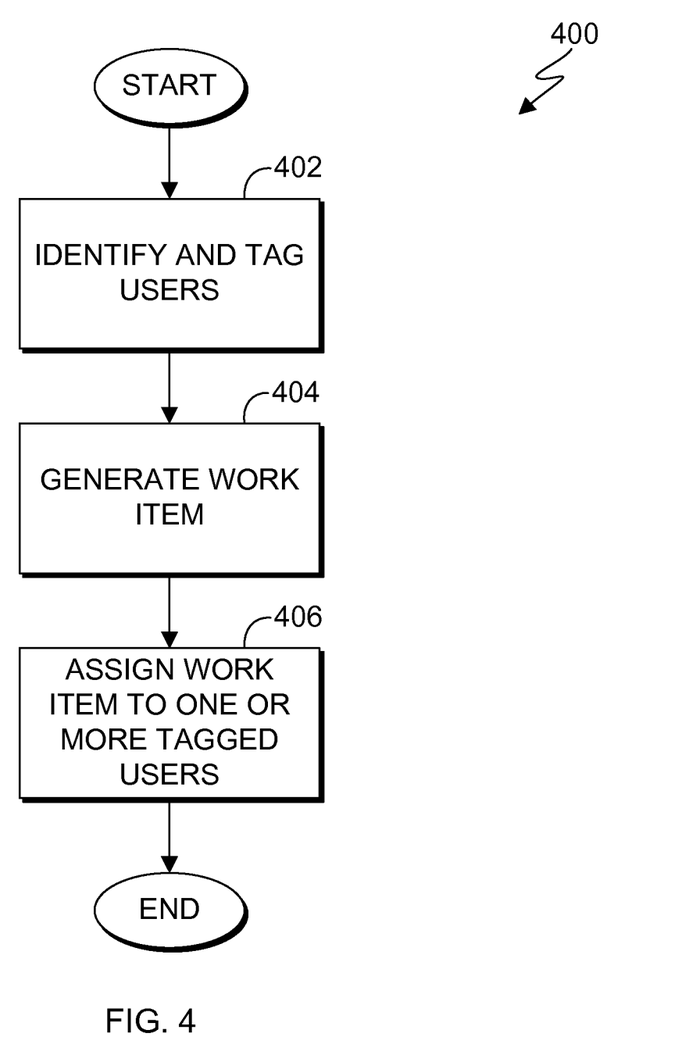
FIG. 4 is a flowchart illustrating operational steps for generating and assigning a work item to one or more users, in accordance with an embodiment of the present invention.

FIG. 4 is a flowchart 400 illustrating operational steps for generating and assigning a work item to one or more administrative users, in accordance with an embodiment of the present invention. In this embodiment, the work item assigned to the one or more administrative users is generated after assigning and/or ascertaining a risk level for a detected error message. Furthermore, the work item can be an instruction or an indication to address an error message or issue reported to content providers 120.

In step 402, subscribers 142 identify and tags one or more administrative users. In one embodiment, a group of one or more administrative users may be identified as a default support team to address newly generated work items, based on the nature of the work item. For example, a group of administrative users may be identified as a support team for user interface related error messages, and another group of administrative users may be identified as a support team for platform related error messages. In another embodiment, computer system 140 may identify and tag an administrative user that has been handling previous work items related to the newly reported error message. Furthermore, computer system 140 may reference API 148 which may include schedules, vacation times, and other relevant scheduling information for administrative users to identify and tag available administrative users.

In step 404, subscribers 142 generates a work item for the error message or issue. In this embodiment, the generated work item describes the error message or issue, any associated defect, and defect description, as well as the risk level associated with the reported error message or issue. In another embodiment, a work item that is generated may include more than one related error message and/or issue to be addressed by an administrative user.

In step 406, subscribers 142 assign the generated work item to the identified administrative users. In this embodiment, the identified and tagged administrative users are assigned to perform the generated work item, such that the error message or issue contained in text content of content providers 120 is addressed, and any associated defects are resolved. As previously described, the work item may be assigned to an administrative user responsible for a particular module of the product in development. Accordingly, once the administrative user receives a work item, the administrative user modifies the module of the product, in accordance with the text content associated with the reported issue or error message.

Figure 5:
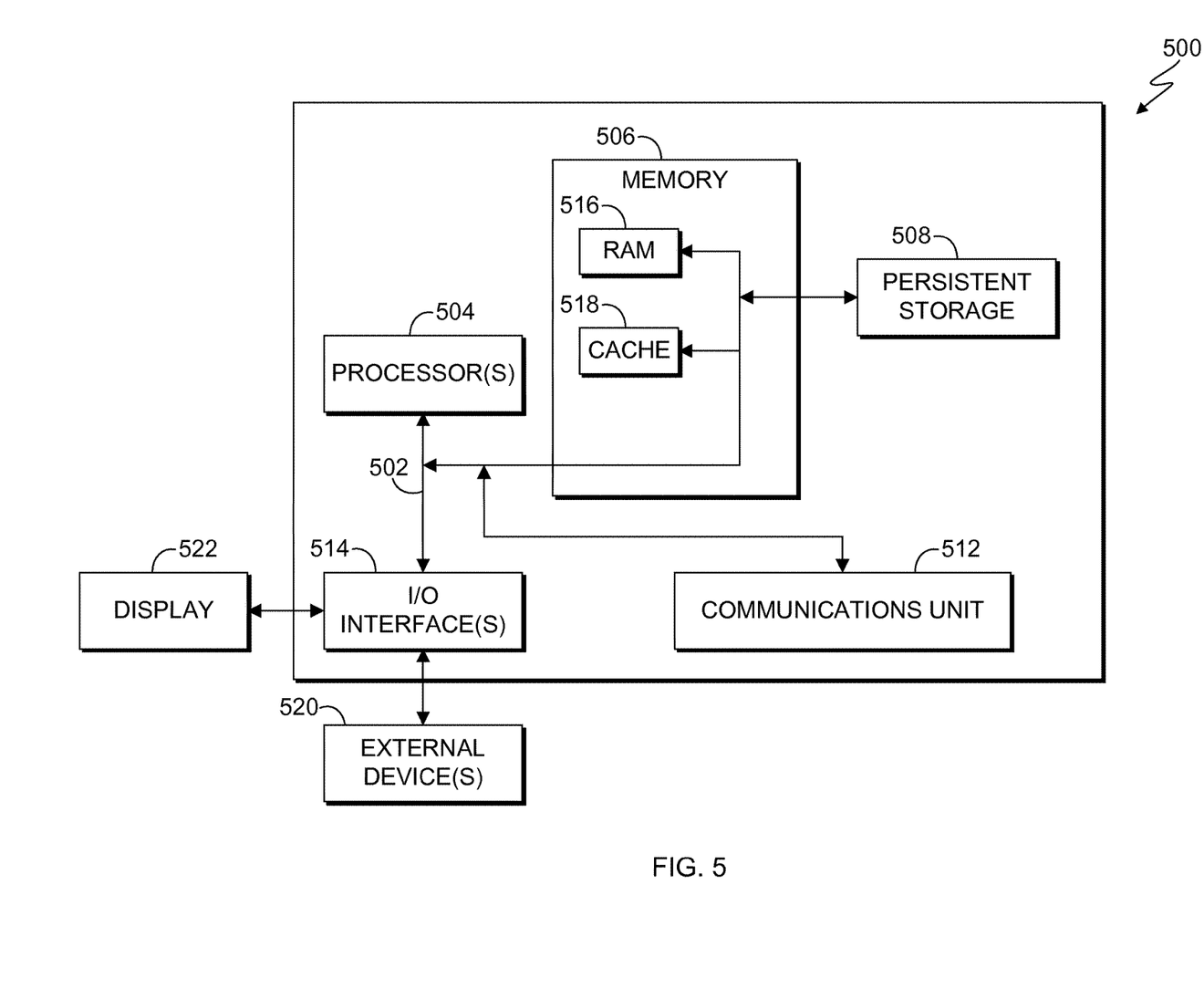
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 130). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520, such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

Figure 6:
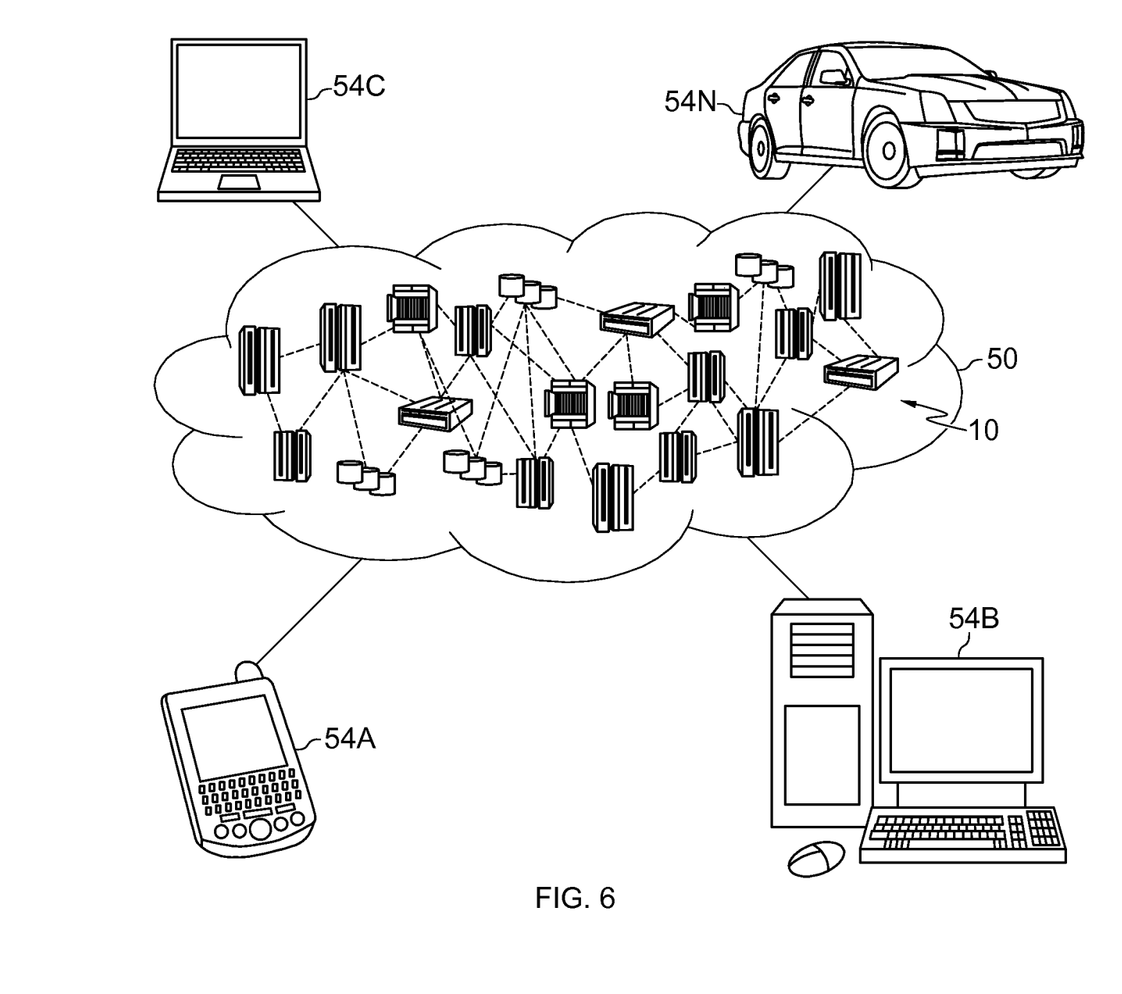
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that cloud computing nodes 10 and cloud computing environment 50 can communicate with any type of computerized device over any type of network and/or network addressable connection (e.g., using a web browser).

Figure 7:
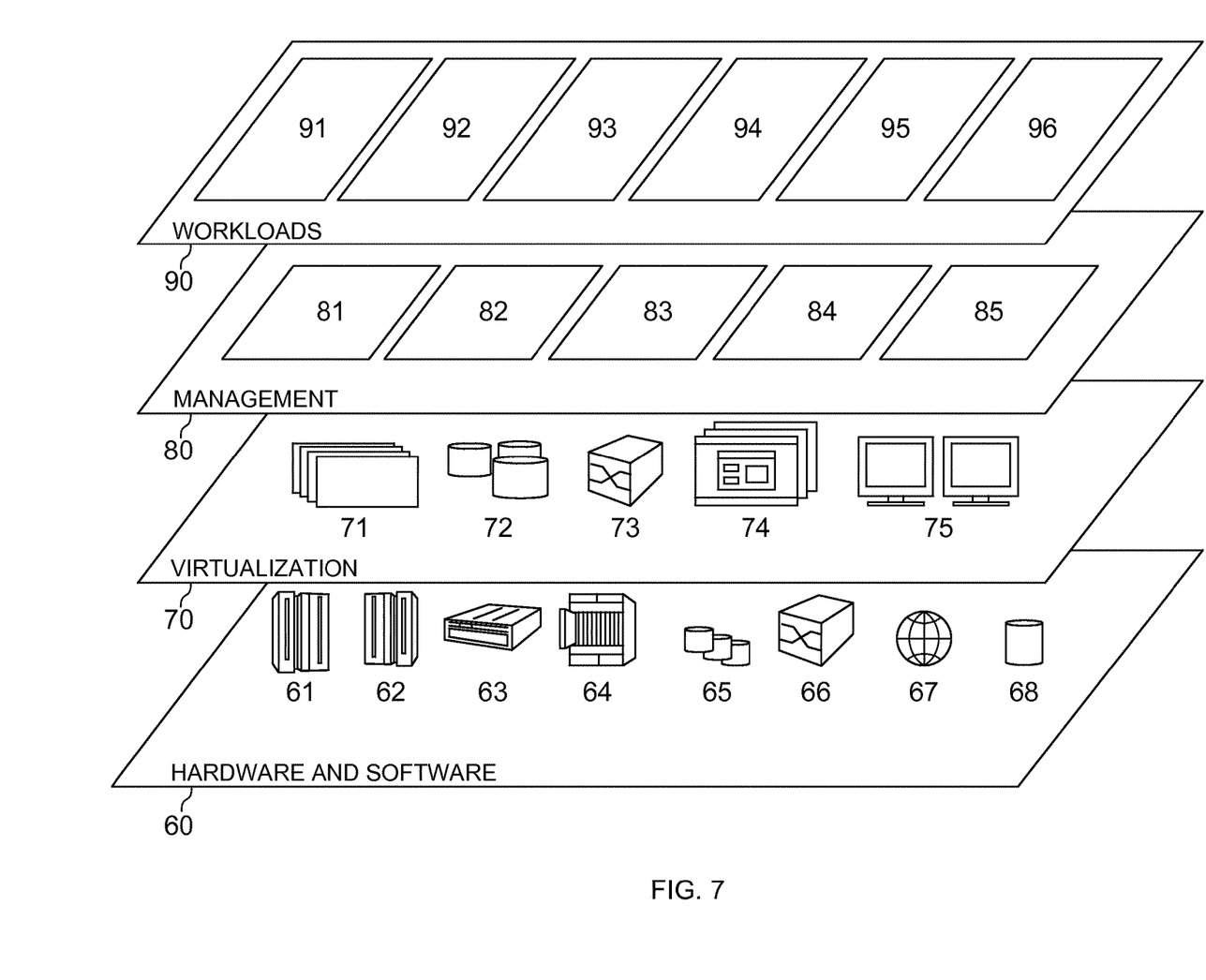
FIG. 7 depicts abstraction model layers, in accordance with an embodiment of the present invention.

Referring now to FIG. 7, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and risk level assessment system 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

What is claimed is:

1. A method comprising:
   receiving, by one or more computer processors, text content provided to one or more content providers that contains one or more textual elements describing an issue experienced by a user interacting with a product in development, wherein the text content is reported by a first user in a first online forum used by a plurality of users for collaboration;
   parsing, by one or more computer processors, the received text content into one or more textual elements of interest associated with the issue,
      wherein the one or more textual elements are weighed based on one or more conditions to identify one or more textual elements of interest by utilizing a term-frequency-inverse-document (TFIDF) weighing mechanism, one or more textual elements not of interest is identified and discarded by utilizing the TFIDF weighing mechanism, and wherein the one or more conditions includes a pre-determined importance of the text elements, a frequency of text elements, a plurality of views for an identified instance, a plurality of replies to an identified instance, or a plurality of responses to an identified instance;
   determining, by one or more computer processors, whether there exists issue entries in a repository that include one or more of the textual elements of interest, wherein each entry includes a predetermined risk level associated with the issue that indicates a likelihood that the issue will hinder the user interaction with the product;
   responsive to determining that there exists a plurality of entries in a repository that include one or more of the textual elements of interest:
      identifying, by one or more computer processors, an entry in the repository that most closely matches the one or more textual elements of interest,
         wherein a cosine similarity evaluation of a plurality of results generated from a database is automatically triggered to compare and identify the most closely matched entry from the plurality of entries, and the database includes a plurality of known error message strings utilized to poll one or more online community forums;
      determining, by one or more computer processors, a risk level for the issue, based, in part, on the predetermined risk level of the identified entry, wherein the determined risk level for the issue is stored in the database, and when two or more of the entries of the plurality of entries match the one or more textual elements of interest, determining a different risk level for each of the two or more entries;
   assigning, by one or more computer processors, a work item to an administrative user, wherein the work item indicates to the administrative user to resolve the issue, wherein the work item is assigned based on the nature of the work item, the availability of the administrative user, and the experience of the administrative user to a plurality of previous work items associated with the identified entry;
   modifying, by the administrative user, the module of the product in development based on the received text content associated with the issue; and
   responsive to determining that no entries in the repository include one or more of the textual elements of interest, determining, by one or more computer processors, a risk level based, in part, on the one or more textual elements of interest by:
      identifying, by one or more computer processors, one or more metrics of the content providers, including at least a number of unique views received in the online forum for the issue reported to the content providers, and
      assigning, by one or more computer processors, a risk level to the issue, based, at least in part on, the one or more identified metrics.

2. The method of claim 1, further comprising:
   responsive to determining that there exists a single entry in the repository that includes one or more of the textual elements of interest:
      assigning, by one or more computer processors, the predetermined risk level of the single entry to the risk level for the issue.

3. The method of claim 1, further comprising:
   determining, by one or more computer processors, a similarity coefficient between the more than one matching entries of the repository that indicates how closely contents of each entry match the one or more textual elements of interest.

4. The method of claim 1, wherein assigning the work item to an administrative user comprises:
   generating, by one or more computer processors, the work item based, at least in part on, the one or more textual elements of interest; and
   identifying, by one or more computer processors, the administrative user to assign the work item to.

5. The method of claim 1, wherein textual elements of interest include one or more of: error messages, error codes, issue descriptions, and other textual elements that are identified as associated with the issue.

6. A computer program product comprising:
   one or more computer readable storage media and program instructions stored on the one or more computer readable storage media, the program instructions comprising:
   program instructions to receive text content provided to one or more content providers that contains one or more textual elements describing an issue experienced by a user interacting with a product in development, wherein the text content is reported by a first user in a first online forum used by a plurality of users for collaboration;
   program instructions to parse the received text content into one or more textual elements of interest associated with the issue, wherein the one or more textual elements are weighed based on one or more conditions to identify one or more textual elements of interest by utilizing a term-frequency-inverse-document-frequency (TFIDF) weighing mechanism, and one or more textual elements not of interest is identified and discarded by utilizing the TFIDF weighing mechanism, and wherein the one or more conditions includes a pre-determined importance of the text elements, a frequency of text elements, a plurality of views for an identified instance, a plurality of replies to an identified instance, or a plurality of responses to an identified instance;

program instructions to determine whether there exists issue entries in a repository that include one or more of the textual elements of interest, wherein each entry includes a predetermined risk level associated with the issue that indicates a likelihood that the issue will hinder the user interaction with the product;

program instructions to, responsive to determining that there exists a plurality of entries in a repository that include one or more of the textual elements of interest: identify an entry in the repository that most closely matches the one or more textual elements of interest, wherein a cosine similarity evaluation of a plurality of results generated from a database is automatically triggered to compare and identify the most closely matched entry from the plurality of entries, and the database includes a plurality of known error message strings utilized to poll one or more online community forums;

determine a risk level for the issue, based, in part, on the predetermined risk level of the identified entry, wherein the determined risk level for the issue is stored in the database, and when two or more of the entries of the plurality of entries match the one or more textual elements or interest, determining a different risk level for each of the two or more entries;

program instructions to assign a work item to an administrative user, wherein the work item indicates to the administrative user to resolve the issue, wherein the work item is assigned based on the nature of the work item, the availability of the administrative user, and the experience of the administrative user to a plurality of previous work items associated with the identified entry;

program instructions to modify, by the administrative user, the module of the product in development based on the received text content associated with the issue; and program instructions to, responsive to determining that no entries in the repository include one or more of the textual elements of interest, determine a risk level based, in part, on the one or more textual elements of interest by:

identifying, by one or more computer processors, one or more metrics of the content providers, including at least a number of unique views received in the online forum for the issue reported to the content providers, and assigning, by one or more computer processors, a risk level to the issue, based, at least in part on, the one or more identified metrics.

7. The computer program product of claim 6, further comprising:

program instructions to, responsive to determining that there exists a single entry in the repository that includes one or more of the textual elements of interest:
assign the predetermined risk level of the single entry to the risk level for the issue.

8. The computer program product of claim 6, further comprising:
program instructions to determine a similarity coefficient between the more than one matching entries of the repository that indicates how closely contents of each entry match the one or more textual elements of interest.

9. The computer program product of claim 6, wherein program instructions to assign the work item to an administrative user comprise:
program instructions to generate the work item based, at least in part on, the one or more textual elements of interest; and
program instructions to identify the administrative user to assign the work item to.

10. The computer program product of claim 6, wherein textual elements of interest include one or more of: error messages, error codes, issue descriptions, and other textual elements that are identified as associated with the issue.

11. A computer system, comprising:
one or more computer processors, one or more computer readable storage media, and program instructions stored on the one or more computer readable storage media for execution by at least one of the one or more processors, the program instructions comprising:

program instructions to receive text content provided to one or more content providers that contains one or more textual elements describing an issue experienced by a user interacting with a product in development, wherein the text content is reported by a first user in a first online forum used by a plurality of users for collaboration;

program instructions to parse the received text content into one or more textual elements of interest associated with the issue,
wherein the one or more textual elements are weighed based on one or more conditions to identify one or more textual elements of interest by utilizing a term-frequency-inverse-document-frequency (TFIDF) weighing mechanism, and one or more textual elements not of interest is identified and discarded by utilizing the TFIDF weighing mechanism, and wherein the one or more conditions includes a pre-determined importance of the text elements, a frequency of text elements, a plurality of views for an identified instance, a plurality of replies to an identified instance, or a plurality of responses to an identified instance;

program instructions to determine whether there exists issue entries in a repository that include one or more of the textual elements of interest, wherein each entry includes a predetermined risk level associated with the issue that indicates a likelihood that the issue will hinder the user interaction with the product;

program instructions to, responsive to determining that there exists a plurality of entries in a repository that include one or more of the textual elements of interest: identify an entry in the repository that most closely matches the one or more textual elements of interest, wherein a cosine similarity evaluation of a plurality of results generated from a database is automatically triggered to compare and identify the most closely matched entry from the plurality of entries, and the database includes a plurality of known error message strings utilized to poll one or more online community forums;

determine a risk level for the issue, based, in part, on the predetermined risk level of the identified entry, wherein the determined risk level for the issue is stored in the database, wherein when two or more of the entries of the plurality of entries match the one or more textual elements or interest, determining a different risk level for each of the two or more entries;

program instructions to assign a work item to an administrative user, wherein the work item indicates to the administrative user to resolve the issue, wherein the work item is assigned based on the nature of the work item, the availability of the administrative user, and the experience of the administrative user to a plurality of previous work items associated with the identified entry;

program instructions to modify, by the administrative user, the module of the product in development based on the received text content associated with the issue; and program instructions to, responsive to determining that no entries in the repository include one or more of the textual elements of interest, determine a risk level based, in part, on the one or more textual elements of interest by:

identifying, by one or more computer processors, one or more metrics of the content providers, including at least a number of unique views received in the online forum for the issue reported to the content providers, and assigning, by one or more computer processors, a risk level to the issue, based, at least in part on, the one or more identified metrics.

12. The computer system of claim 11, further comprising:
program instructions to, responsive to determining that there exists a single entry in the repository that includes one or more of the textual elements of interest:
assign the predetermined risk level of the single entry to the risk level for the issue.

13. The computer system of claim 11, further comprising:
program instructions to determine a similarity coefficient between the more than one matching entries of the repository that indicates how closely contents of each entry match the one or more textual elements of interest.

14. The computer system of claim 11, wherein program instructions to assign the work item to an administrative user comprise:
program instructions to generate the work item based, at least in part on, the one or more textual elements of interest; and
program instructions to identify the administrative user to assign the work item to.

15. The computer system of claim 11, wherein textual elements of interest include one or more of: error messages, error codes, issue descriptions, and other textual elements that are identified as associated with the issue.

* * * * *